United States Patent Office 2,829,164
Patented Apr. 1, 1958

2,829,164

METHOD OF MAKING PENTACHLOROANILINE AND CERTAIN NEW N-SUBSTITUTED PENTACHLOROANILINES AND ALKYL TETRACHLORO ANALOGS

Albert L. Rocklin, Concord, Calif., assignor to The Dow Chemical Company, Midland, Mich., a corporation of Delaware No Drawing. Application September 13, 1955
Serial No. 534,154

18 Claims. (Cl. 260—570.5)

This invention relates to a method of making pentachloroaniline and certain new N-substituted pentachloroanilines from hexachlorobenzene, and of making alkyl tetrachloroanilines from alkyl pentachlorobenzenes, in which the alkyl group has from 1 to 8 carbon atoms, and to the new compounds so produced.

There are many fields in which polychloroaromatic compounds are useful, including, for example, the field of plasticizers for polyvinyl chloride, the field of fire-retardant coatings, and the field of weather resistant wood impregnants. In addition, a polychloroaromatic nucleus would be a desirable adjunct to amino compounds used to cure poly epoxide resins, or as hydrogen chloride absorbing stabilizers and plasticizers of polyvinyl chloride or polyvinylidene chloride, because of the increased compatibility and better light stability which the polychloroaromatic group can contribute to such amino compounds. The optimum chlorine content for such an amine is the maximum amount capable of being substituted on the benzene ring. In the case of aniline and N-substituted anilines, this is a pentachloroderivative, while in the case of anilines having an alkyl group attached to the benzene ring, it is a tetrachloro derivative.

The prior methods for making pentachloroaniline have been unsatisfactory. These have involved either the chlorination of aniline, to form a crude mixture at best, or the reduction of pentachloronitrobenzene, or the reaction between alcoholic anhydrous ammonia and hexachlorobenzene at temperatures above 220° C. and at pressures of the order of 100 atmospheres. Each of these procedures is difficult enough for preparing pentachloroaniline, and is impossible for the preparation of many desirable N-substituted pentachloroanilines. A better and more convenient method for making pentachloroaniline is desired, and especially such a method which is applicable as well to the production of new N-substituted pentachloroanilines, such as the secondary and tertiary pentachlorophenyl alkyl, alkenyl, hydroxyalkyl and amino-alkyl amines. It is the object of this invention to provide such an improved method, and to produce new compounds of the types just named.

According to the method of the present invention, pentachloroaniline and its N-substituted alkyl, alkenyl, hydroxyalkyl, aminoalkyl and related derivatives may be made readily, at moderate pressures often as low as atmospheric and at reaction temperatures in the range from 75° to 250° C., by heating hexachlorobenzene and the appropriate nitrogen compound alone or in an aqueous or inert solvent medium and advantageously in contact with catalytic amounts of iron or copper chlorides. With nitrogenous reagents and reaction media boiling in the range from 100° C. to 200° C., the reaction is conveniently effected at atmospheric pressure.

The method of the invention is applicable to the preparation of 2,3,4,5,6-pentachloroaniline and such N-substituted anilines as the N-pentachlorophenyl mono- and dialkylamines wherein the alkyl groups have from 1 to 8 carbon atoms, N-pentachlorophenyl allylamine, N-pentachlorophenyl mono- and dialkanolamines wherein the alkanol groups have from 2 to 3 carbon atoms, N-pentachlorophenyl alkanolaminoalkyl amines in which each alkanol and alkylamine group contains from 2 to 3 carbon atoms, mono-N-pentachlorophenyl polymethylene diamines in which the polymethylene group has from 2 to 6 carbon atoms, bis-(N-pentachlorophenyl) polymethylene diamines in which the polymethylene group contains from 3 to 6 carbon atoms, and N-pentachlorophenyl benzyl and phenethyl amines. It is applicable as well to the preparation of the corresponding alkyl tetrachloroaniline compounds from the alkyl pentachlorobenzenes in which the alkyl group contains from 1 to 8 carbon atoms. All of the primary and secondary amine products of the new process are useful as curing agents for epoxy resins—the resinous reaction products of polyhydric alcohols or polyhydric phenols with such haloepoxides as epichlorohydrin. Those compounds which have two or more carbon atoms in a group or groups attached to the nitrogen atom of pentachloroaniline, i. e., all of the compounds listed above except pentachloroaniline itself and its mono-N-methyl substitution product, are compatible with polyvinyl chloride and with vinylidene chloride-vinyl chloride copolymers, in concentrations sufficient to serve as hydrogen chloride absorbing stabilizers for the polymers, and some of them are additionally useful as plasticizers for such polymers.

The following examples illustrate the method of the invention, and describe numerous new compounds produced by that method.

Example 1

To 800 ml. of boiling ethylene diamine (117° C.) was added over the course of 30 minutes 100 grams of hexachlorobenzene. The resulting solution was boiled for 15 minutes longer and then cooled to room temperature and diluted to a volume of 3 liters with water. A heavy white precipitate appeared which was recovered by filtration, washed with water, and dried. Its dry weight was 103.7 grams, representing a yield of 96 percent of white crystalline N-pentachlorophenyl ethylene diamine, melting at 91°–93° C. Titration of an aqueous methanol solution with acid showed the product to have an equivalent weight of about 312, compared to the theoretical value of 308.4.

Example 2

In a similar manner, hexachlorobenzene was dissolved in and reacted with boiling monoethanolamine (172° C.). The product was recovered in the same manner as that described in Example 1. N-pentachlorophenyl ethanolamine is a white crystalline solid melting at 77°–79° C., and gives the standard reactions for primary alcohols and for secondary amines. Ultimate analysis of the product showed:

|  | C | H | Cl | N |
|---|---|---|---|---|
|  | Percent | Percent | Percent | Percent |
| Determined | 31.0 | 1.9 | 54.7 | 4.9 |
| Theoretical | 31.0 | 1.95 | 57.3 | 4.52 |

Example 3

Hexachlorobenzene was dissolved in and reacted with boiling benzylamine (185° C.). A white crystalline N-pentachlorophenyl benzylamine was obtained in nearly theoretical yield, melting at 68° C. Carbon and chlorine analyses agreed with theoretical values.

Example 4

2-ethyl hexylamine was heated to its boiling point (167° C.) and hexachlorobenzene was added, with stirring. When solution was complete, heating was continued for 30 minutes. The solution was cooled and diluted with water. A pale yellow oil separated, and this was purified by vacuum distillation. The N-pentachlorophenyl 2-ethylhexylamine distilled at 168° C.–172° C. at 0.4 millimeter. It is an oily liquid whose analysis corresponds to that for $C_6Cl_5NHCH(C_2H_5)C_4H_9$. This compound is especially good as a plasticizer for polyvinyl chloride.

Example 5

Fifty grams of hexachlorobenzene and 250 ml. of liquid methylamine, precooled to −30° C., were sealed in a glass tube and heated to 175° C. in the course of 45 minutes, and held at that temperature for 30 minutes. The tube was cooled to room temperature and was opened. No evidence of residual pressure was observed when the tube was opened. On shaking, a solid separated from the initially clear but somewhat amber solution. The mixture was diluted with water and was filtered. The solid was dissolved in hot methanol, decolorized with activated charcoal, and recrystallized after filtering off the charcoal. The crystals were dissolved in isobutyl alcohol and, on recrystallization, had a melting point of 100°–101° C. Their analysis agreed closely with that for $C_6Cl_5NHCH_3$. The yield was over 60 percent.

Example 6

One hundred and fifty grams of hexachlorobenzene was mixed with 200 ml. of n-octylamine, and the mixture was heated to the boiling point (initially about 180° C.) at atmospheric pressure. After boiling for one hour, the boiling point of the mixture had increased to 241° C. The mixture was cooled and diluted with water. The organic layer was separated and washed repeatedly with water. Residual water and 10.5 grams of unreacted hexachlorobenzene were removed by distillation. The remaining amine melted at 7.5° C. and distilled at 180° C. at 0.6 mm. The product, weighing 179.3 grams, represented a yield of 96 percent based on the unrecovered hexachlorobenzene. The product is a secondary amine, and analysis showed it to be N-pentachlorophenyl n-octylamine.

|   | Calculated | Found |
|---|---|---|
|   | Percent | Percent |
| C | 44.6 | 43.6 |
| Cl | 46.9 | 46.33 |
| N | 3.7 | 3.76 |
| H | 4.8 | 4.65 |

Example 7

Five grams of hexachlorobenzene and 25 ml. of allylamine (B. P. 53° C.) were sealed in a glass-lined pressure vessel and heated in the course of 30 minutes to 150° C. The temperature was held in the range from 150° to 175° C. for two hours and then the vessel was cooled to room temperature in the course of 30 minutes. The reaction mixture was a clear, amber liquid from which an organic liquid phase separated upon dilution with water. The organic phase solidified when cold. It was melted, washed with water, with dilute hydrochloric acid and with more water. The remaining product was crystallized from methanol and recrystallized from aqueous methanol. The N-pentachlorophenyl allylamine melted at 68°–69° C. Analysis showed it to be a secondary amine and to contain 35.5 percent carbon and 58.9 percent chlorine. The theoretical values are 35.4 and 58.04 percent, respectively.

Example 8

N-pentachlorophenyl N'-hydroxyethyl ethylene diamine was prepared by heating 25 grams of hexachlorobenzene and 100 grams of N-(mono-hydroxyethyl) ethylene diamine at 190° C. for 15 minutes. A clear, amber liquid was formed. The liquid was cooled, washed twice with water and then with a hydrochloric acid-sodium chloride solution, whereupon a granular by-product was precipitated. This was removed by filtration and the filtrate was neutralized with sodium hydroxide, resulting in precipitation of an impure product. The product was crystallized successively from methanol, water and perchloroethylene, with small amounts of by-product separating and being ejected each time. After decolorizing its perchloroethylene solution with charcoal, the crystalline product was recrystallized from 65 percent methanol—35 percent water. The crystals melt in the range from 85° to 89° C. The product was found to contain 34 percent carbon and 51 percent chlorine.

Example 9

About 240 grams of hexamethylene diamine was preheated to 120°–130° C. and 50 grams of hexachlorobenzene was added. Solution occurred in about 10 minutes, and the solution was held near 125° C. for 15 minutes thereafter. The solution was cooled and diluted to a volume of 400 ml. with water. An organic layer separated, consisting of a viscous liquid and unreacted hexachlorobenzene. The liquid was taken up in methanol and was then purified by distillation at 194° C. at 0.4 mm. The distillate crystallized and the crystalline product melted at 58°–61° C. It has an equivalent weight, determined by acid titration, of 375 whereas the theoretical value for mono-(N-pentachlorophenyl) hexamethylene diamine is 365. Analysis showed it to contain 39.6 percent carbon and 47.8 percent chlorine, with the theoretical values being 39.5 and 48.6 percent respectively.

Example 10

The reagents identified in Example 9 were employed, this time in equimolar proportions of 6.57 grams of the diamine and 16.08 grams of the hexachlorobenzene. To the mixture was added 5.0 grams of sodium hydroxide. The mixture was heated in a closed vessel to 135° C. over the course of an hour and held at that temperature for 2.5 hours. On cooling and dilution with water, the solid organic phase was melted and washed twice with hot water. The solid was dissolved in hot xylene, filtered, cooled, and the filtered solution was treated with gaseous hydrogen chloride. This caused the formation of a xylene-insoluble phase which was separated and discarded. On standing overnight, a solid suspension appeared in the xylene liquor. More hydrogen chloride was passed into the liquor, and the solid which separated was washed with pentane and dissolved in methylene chloride. The resulting solution was neutralized with aqueous sodium hydroxide. The solvent was evaporated from the product, and the latter was recrystallized from dimethyl formamide and then from isobutyl alcohol. It melted at 123.5° to 125° C. Ultimate analysis showed it to be a secondary diamine, free from primary amine groups, and to conform to the formula $$C_6Cl_5NH(CH_2)_6NHC_6Cl_5$$

or bis-(N-pentachlorophenyl) hexamethylene diamine.

Example 11

N-pentachlorophenyl dimethylamine was prepared by heating 50 grams of hexachlorobenzene and 250 ml. of dimethylamine in a glass-lined pressure vessel at 150°–175° C. for about 2 hours. The vessel was cooled and the solid product was washed with dilute hydrochloric acid and with water. It melted in contact with hot water. On recrystallization from methanol, a 69 percent yield of N-pentachlorophenyl dimethylamine was obtained, melting at 54°–55° C.

Example 12

Fifty grams of hexachlorobenzene was heated for 18 hours with 100 ml. of diamylamine at temperatures from 180° C. to the boiling point (about 205° C.) of the amine at atmospheric pressure. The mixture was cooled and extracted with acetone, to leave unreacted hexachlorobenzene undissolved. The extract was freed from acetone and extracted again with n-propanol. The amine product recovered from the propanol solution was a liquid having the following analysis

|    | Calculated for $C_6Cl_5N(C_5H_{11})_2$ | Found |
|----|----------------------------------------|-------|
|    | Percent                                | Percent |
| C  | 47.4                                   | 44.9  |
| Cl | 43.9                                   | 43.25 |
| N  | 3.45                                   | 3.77  |
| H  | 5.42                                   | 4.95  |

Example 13

Pentachloroaniline was prepared by heating 100 grams hexachlorobenzene and 350 ml. of liquid ammonia to 200° C. in a stainless steel pressure vessel for one hour. The excess ammonia was then vented and the solid product was treated with 600 ml. of hot concentrated sulfuric acid, cooled, filtered to remove unreacted hexachlorobenzene, and diluted to 3 liters with water. The so precipitated pentachloroaniline was washed with water, dried and recrystallized from acetone. Its properties agreed with those recorded in the literature. The product weighed 47.7 grams, representing a conversion of 51 percent of the original charge of hexachlorobenzene. The yield, after crediting recovered hexachlorobenzene, was nearly theoretical. In a series of runs of shorter duration, the proportion of hexachlorobenzene converted to pentachloroaniline varied in the following manner. Each run was made for 20 minutes at 200° C. One run was uncatalyzed, while one used 0.9 percent ferric chloride and one used 1 per cent cuprous chloride, based on the weight of hexachlorobenzene.

Catalyst: Percent conversion in 20 minutes
 None _____ 19.4
 Ferric chloride _____ 33.5
 Cuprous chloride _____ 47.8

Example 14

One hundred sixty-four grams of hexachlorobenzene, 45.5 ml. of mixed xylenes and 455 ml. of 28 percent aqueous ammonia were heated in a closed vessel with agitation at a temperature of 215° C. for a period of 24 hours. After cooling to room temperature, the contents of the vessel were removed and filtered. The aqueous filtrate was discarded and the solid residue and xylene phase were taken up in 1100 ml. of boiling perchloroethylene. The hot solution was decolorized with charcoal which was then removed by filtration and washed with 100 ml. of hot perchloroethylene. The filtrate and washing were combined and when cooled and partially evaporated, yielded 128 grams of crystalline pentachloroaniline, free from unreacted hexachlorobenzene.

Example 15

N-pentachlorophenyl diethanolamine was prepared by dissolving 5 grams of hexachlorobenzene in 50 ml. of diethanolamine and heating the mixture at about 200° C. for 15 minutes. It was kept at a temperature near 75°–100° C. for an hour thereafter, and then diluted with water, whereupon a dark liquid separated which solidified on cooling. This was washed with hydrochloric acid and crystallized from methanol. There was too little product for complete characterization, but it was found to be a tertiary amine.

Example 16

Five grams of hexachlorobenzene and 20 ml. of 2-phenylethylamine were heated to 185° C., slightly below the boiling point (195° C.) of the amine, for about 2 hours. After dilution with water, washing with acid, extraction with methylene chloride and neutralization with alkali, a clear amber liquid was obtained which gave the reactions of a secondary amine. There was too little remaining liquid for an accurate boiling point determination. The yield was estimated at about 50 percent.

The preparations reported in the several examples (except Example 14) were all made in substantially anhydrous media, and such operation is preferred. In most cases, the medium was an excess of the amine reagent. In Example 14 the reagent was supplied as aqueous ammonia and the reaction took place in an inert hydrocarbon. It is not essential to use an anhydrous reagent or an organic solvent as it has been found that aqueous solutions of ammonia or the various water-soluble amines react with hexachlorobenzene to form the described products, but that longer reaction times, or slightly higher reaction temperatures, or both, are needed to give good yields. Thus, for the same conversion in equivalent time, aqua ammonia requires a reaction temperature near 250° C. as compared with the 200° C. used in Example 13. When ethylene diamine and hexamethylene diamine were used in 70 percent aqueous solution, temperatures of 150°–190° C. were found more desirable than the 120°–130° C. temperatures shown to be satisfactory in Examples 1, 9 and 10. Inert media which may be used include benzene series hydrocarbons and perchloroethylene.

The lowest temperature at which the most reactive amines react significantly with hexachlorobenzene is about 75° C. Temperatures much above 250° C. should not be maintained for any prolonged period, as they lead to thermal decomposition of reagents or products. The process is carried out most conveniently at atmospheric pressure when using amines having boiling points above 100° C., and at the autogenous superatmospheric pressure of the mixture when the reagents boil below a reaction temperature.

As was shown in Example 13, the rate of reaction is increased materially by carrying out the reaction in the presence of catalytic amounts of iron or copper salts. The valence state of the iron or copper salt employed is unimportant. It is preferred to employ the chlorides of iron or copper, to avoid contamination or solubility problems due to other anions, since the reaction normally produces hydrogen chloride as a by-product.

Because of the formation of hydrogen chloride during the reaction, and because it is desirable to convert the hexachlorobenzene as fully as possible to the pentachloroaniline product, it is most convenient to use a significant molecular excess of the amine, to absorb hydrogen chloride and to drive the reaction toward completion. If desired, other alkaline materials may be used for the same purpose, especially when the reagent amine is expensive or is available in small quantities.

When ammonia is the reactant nitrogen compound, the product pentachloroaniline may be recovered by any of a number of standard methods. However, a very satisfactory method comprises treating the organic mixture following the reaction with concentrated sulfuric acid either at ambient or elevated temperatures. The unreacted hexachlorobenzene, if any be present, does not dissolve and is readily removed by filtration. The pentachloroaniline can then be precipitated simply by dilution with water, although neutralization is equally as effective, and when separated by filtration is found to be of very high purity. In view of the fact that amines, including aniline, are soluble in dilute sulfuric acid, it is surprising that pentachloroaniline is not.

The reactions described herein are surprising in view of the general inertness of hexachlorobenzene which does not react with fused caustic alkalies even after several hours of contact, and is slow to react with hydrogen and oxygen at elevated temperatures.

The primary and secondary amine compounds described herein, including the previously known pentachloroaniline, are effective curing agents for epoxide resins. Thus, a resin formed by the alkali-catalysed reaction between 4,4'-dihydroxy diphenyl dimethyl methane and epichlorohydrin can be converted to an infusible, insoluble product by mixing with it from 0.5 to 2 percent of one of the primary or secondary amines and heating the mixture, suitably in a mold, to a temperature of the order of 50° to 150° C. for a period correspondingly from 4 hours to 15 minutes.

The new N-substituted pentachloroanilines and ring-substituted alkyl tetrachloroanilines, except for the mono-N-methyl pentachloro compound, are compatible with and serve as stabilizers for polyvinyl chloride and polyvinylidene chloride compositions. For this purpose, small amounts, of the order of 0.5 to 5 percent of the weight of polymer, are sufficient. Larger proportions have no ill-effects on the polymeric compositions, and several of the new compounds have a plasticizing effect. These include, as preferred examples, N-pentachlorophenyl n-octylamine and N-pentachlorophenyl (2-ethyl)hexylamine.

I claim:

1. The method which comprises heating to a reaction temperature in the range from 75° C. to 250° C. a mixture consisting essentially of a polychlorohydrocarbon compound from the group consisting of hexachlorobenzene and monoalkyl pentachlorobenzenes wherein the alkyl group contains from 1 to 8 carbon atoms, and at least an equimolar amount of a nitrogen compound from the group consisting of ammonia, mono- and dialkylamines having from 1 to 8 carbon atoms in each alkyl group, allylamine, mono- and dialkanolamines having from 2 to 3 carbon atoms in each alkanol group, alkanolaminoalkylamines having from 2 to 3 carbon atoms in the alkanol group and from 2 to 3 carbon atoms in the alkylamine group, polymethylene diamines having from 2 to 6 carbon atoms, benzylamine and phenethylamines, the reaction being carried out at a pressure sufficient to prevent loss by vaporization of the nitrogen compound while maintaining a reaction temperature in said range until a signficant conversion of the polychlorohydrocarbon to a polychloro-arylamine compound occurs, substantially freeing the reaction mixture from unchanged reagents, and recovering the polychloro-arylamine compound.

2. The method which comprises heating to a reaction temperature in the range from 75° C. to 250° C. a mixture consisting essentially of hexachlorobenzene and at least an equimolar amount of a nitrogen compound from the group consisting of ammonia, mono- and dialkylamines having from 1 to 8 carbon atoms in each alkyl group, allylamine, mono- and dialkanolamines having from 2 to 3 carbon atoms in each alkanol group, alkanolaminoalkylamines having from 2 to 3 carbon atoms in the alkanol group and from 2 to 3 carbon atoms in the alkylamine group, polymethylene diamines having from 2 to 6 carbon atoms, benzylamine and phenethylamines, the reaction being carried out at a pressure sufficient to prevent loss by vaporization of the nitrogen compound while maintaining a reaction temperature in said range until a significant conversion of hexachlorobenzene to N-pentachlorophenyl amine compound occurs, substantially freeing the reaction mixture from unchanged reagents, and recovering the N-pentachlorophenyl amine compound.

3. The method claimed in claim 2, wherein the nitrogen compound is employed as an anhydrous reagent.

4. The method claimed in claim 2, wherein the reaction is effected in an inert liquid medium.

5. The method claimed in claim 2, wherein the reagent nitrogen compound is employed as a water solution.

6. The method claimed in claim 2, wherein the reaction is carried out in contact with a catalyst from the group consisting of the chlorides of iron and copper.

7. The method claimed in claim 2, wherein the reagent nitrogen compound is one having a boiling point at atmospheric pressure of from 100° to 200° C., and the reaction is effected at atmospheric pressure.

8. The method claimed in claim 2, wherein the reagent nitrogen compound is ethylene diamine.

9. The method claimed in claim 2, wherein the reagent nitrogen compound is allylamine.

10. The method claimed in claim 2, wherein the reagent nitrogen compound is monoethanolamine.

11. The method claimed in claim 2, wherein the reagent nitrogen compound is an octylamine.

12. The method claimed in claim 2, wherein the reagent nitrogen compound is ammonia and the product is pentachloroaniline.

13. The method claimed in claim 2, wherein the reagent nitrogen compound is ammonia, the product is pentachloroaniline, and the pentachloroaniline is purified by dissolving the crude reaction mixture in concentrated sulfuric acid, filtering to remove unchanged hexachlorobenzene, and recovering the pentachloroaniline from the acid filtrate by reducing the acid concentration thereof.

14. As a new chemical compound, a member of the group consisting of N-pentachlorophenyl mono- and dialkylamines in which each alkyl group contains from 1 to 8 carbon atoms and there are at least 2 alkyl carbon atoms in the compound, N-pentachlorophenyl allylamine, N-pentachlorophenyl mono- and dialkanolamines in which each alkanol group has from 2 to 3 carbon atoms, N-pentachlorophenyl alkanolaminoalkylamines in which each alkanol group has from 2 to 3 carbon atoms and each alkylamine group has from 2 to 3 carbon atoms, mono-N-pentachlorophenyl polymethylene diamines in which the polymethylene group has from 2 to 6 carbon atoms, bis(N-pentachlorophenyl) polymethylene diamines in which the polymethylene group contains from 3 to 6 carbon atoms, N-pentachlorophenyl benzylamine, N-pentachlorophenyl phenethylamines, and the corresponding monoalkyl tetrachlorophenyl amine compounds in which the alkyl group is attached to the benzene ring and contains from 1 to 8 carbon atoms.

15. N-pentachlorophenyl ethylene diamine.
16. N-pentachlorophenyl allylamine.
17. N-pentachlorophenyl monoethanolamine.
18. N-pentachlorophenyl n-octylamine.

References Cited in the file of this patent

UNITED STATES PATENTS

| | | |
|---|---|---|
| Re. 17,280 | Hale et al. | Apr. 23, 1929 |
| 1,729,775 | Hale et al. | Oct. 1, 1929 |
| 2,432,551 | Williams et al. | Dec. 16, 1947 |

OTHER REFERENCES

Berichte, 72: 298–304 (1939).
Chem. Soc. J. (1943): 372–3.